(12) United States Patent
Fujiwara et al.

(10) Patent No.: US 7,587,426 B2
(45) Date of Patent: Sep. 8, 2009

(54) SYSTEM AND METHOD FOR VIRTUALIZING A DISTRIBUTED NETWORK STORAGE AS A SINGLE-VIEW FILE SYSTEM

(75) Inventors: Shinji Fujiwara, Sagamihara (JP); Nobutoshi Sagawa, Koganei (JP); Tetsuya Uemura, Sayama (JP); Hiroaki Odawara, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 281 days.

(21) Appl. No.: 10/219,770

(22) Filed: Aug. 16, 2002

(65) Prior Publication Data
US 2003/0140051 A1    Jul. 24, 2003

(30) Foreign Application Priority Data
Jan. 23, 2002    (JP) ............................. 2002-013652

(51) Int. Cl.
*G06F 17/30*    (2006.01)
(52) U.S. Cl. ....................... 707/200; 711/100
(58) Field of Classification Search ............. 707/103 R; 709/213, 230
See application file for complete search history.

(56) References Cited

U.S. PATENT DOCUMENTS

| 5,151,989 | A | * | 9/1992 | Johnson et al. ................ 707/10 |
| 5,864,854 | A | * | 1/1999 | Boyle ............................ 707/10 |
| 5,944,789 | A | * | 8/1999 | Tzelnic et al. ............... 709/214 |
| 5,987,477 | A | * | 11/1999 | Schmuck et al. ............. 707/201 |
| 6,029,168 | A | * | 2/2000 | Frey .............................. 707/10 |
| 6,081,807 | A | * | 6/2000 | Story et al. .................... 707/10 |
| 6,308,320 | B1 | * | 10/2001 | Burch ......................... 717/154 |
| 6,311,216 | B1 | * | 10/2001 | Smith et al. .................. 709/226 |
| 6,370,620 | B1 | * | 4/2002 | Wu et al. ..................... 711/132 |
| 6,421,711 | B1 | * | 7/2002 | Blumenau et al. ........... 709/213 |
| 6,505,241 | B2 | * | 1/2003 | Pitts ............................ 709/203 |
| 6,542,964 | B1 | * | 4/2003 | Scharber ..................... 711/122 |
| 6,704,730 | B2 | * | 3/2004 | Moulton et al. ................ 707/6 |
| 6,754,800 | B2 | * | 6/2004 | Wong et al. .................. 711/216 |
| 6,772,161 | B2 | * | 8/2004 | Mahalingam et al. ......... 707/10 |

(Continued)

OTHER PUBLICATIONS

C. Karamanolis et al. An Architecture for Scalable and Manageable File Services. Copyright Hewlett-Packard Company Jul. 12, 2001.*

(Continued)

*Primary Examiner*—Neveen Abel Jalil
(74) *Attorney, Agent, or Firm*—Stites & Harbison, PLLC; Juan Carlos A. Marquez, Esq.

(57) ABSTRACT

The invention relates to a method of virtualizing a plurality of network storages into a single-view file system for a client and obtains information about an object's storage location without inquiring of a resource manager. The method determines a network storage that should store an object based on a hash value generated from a logical identifier for the object to be accessed. While accessing the object, the method computes the hash value for the object's logical identifier to determine a network storage that should process an access request. Consequently, the method eliminates the need to inquire the object's storage location when the access request is issued. Further, the method eliminates the need to maintain the object's storage location when the number of servers is increased or decreased, thus providing easy management.

7 Claims, 10 Drawing Sheets

U.S. PATENT DOCUMENTS

| | | | |
|---|---|---|---|
| 6,782,389 B1 * | 8/2004 | Chrin et al. | 707/10 |
| 6,807,632 B1 * | 10/2004 | Carpentier et al. | 713/165 |
| 6,813,690 B1 * | 11/2004 | Lango et al. | 711/118 |
| 6,842,784 B1 * | 1/2005 | Black | 709/225 |
| 6,907,414 B1 * | 6/2005 | Parnell | 706/47 |
| 6,915,302 B1 * | 7/2005 | Christofferson et al. | 707/102 |
| 6,952,737 B1 * | 10/2005 | Coates et al. | 709/229 |
| 6,985,956 B2 * | 1/2006 | Luke et al. | 709/229 |
| 7,313,694 B2 * | 12/2007 | Riedel et al. | 713/165 |
| 7,360,034 B1 * | 4/2008 | Muhlestein et al. | 711/148 |
| 7,418,439 B2 * | 8/2008 | Wong | 707/2 |
| 2002/0004846 A1 * | 1/2002 | Garcia-Luna-Aceves et al. | 709/245 |
| 2002/0038296 A1 * | 3/2002 | Margolus et al. | 707/1 |
| 2002/0120763 A1 * | 8/2002 | Miloushev et al. | 709/230 |
| 2003/0037061 A1 * | 2/2003 | Sastri et al. | 707/103 |
| 2003/0177178 A1 * | 9/2003 | Jones et al. | 709/203 |
| 2005/0097313 A1 * | 5/2005 | Bolosky et al. | 713/150 |

OTHER PUBLICATIONS

Darell C. Anderson et al. Interposed Request Routing for Scalable Network Storage. Processdings of the 4th conference on Symposium on Operating System Design & Implementation-vol. 4. Year 2000.*

Matt Blaze. A Crptographic File SYstem for Unix. AT & T Bell Laboratories. Nov. 3-5, 1993.*

Adapting publish/subscribe middleware to achieve Gnutella-like functionality. Proceedings of the 2001 ACM symposium on Applied computing table of contents-Las Vegas, Nevada, United States. Year of Publication: 2001 ☐☐Dennis Heimbigner.*

Archipelago: An Island-Based File System For Highly Available And Scalable Internet Services. Minwen Ji et al. Published in 2000.*

John H. Hartman and John K. Ousterhout, "The Zebra Striped Network File System", ACM Transactions on Computer Systems, vol. 13, No. 3, Aug. 1995, pp. 274-310.

U.S. Appl. No. 60/289,129 Sastri et al, filed May 7, 2001.

* cited by examiner

SYSTEM AND METHOD FOR VIRTUALIZING A DISTRIBUTED NETWORK STORAGE AS A SINGLE-VIEW FILE SYSTEM

FIELD OF THE INVENTION

The present invention relates to a method of virtualizing a network storage and particularly to a method of allowing a plurality of file systems to be viewed as a single system.

BACKGROUND OF THE INVENTION

A conventional information processing system stores information in a storage directly connected to a computer system. An access to information stored in the storage is permitted only through the use of the directly connected computer. Accordingly, the other computer systems need to access the data via the directly connected computer. In recent years, the development of network technologies and a dramatic increase in the amount of information to be stored promote separation of a computer system for processing information and a storage system for storing information. A storage is connected to the network and has become capable of being shared by a plurality of computer systems. Such networked storage is referred to as a network storage.

Examples of such network storage include a storage area network (SAN) storage that is connected by an SAN and provides a block access; a network attached storage (NAS) that is connected by an IP network, Infiniband, etc. and provides a file access; and a Web storage that offers an access according to an interface HTTP protocol or its extended protocol for Web accesses.

As network storages become widely used, a system administrator needs to manage a plurality of network storages connected to the network. When the amount of data to be stored exceeds a maximum value for the existing network storage, for example, it is necessary to add a new network storage and reconfigure the system by re-distributing data or the like. A drastic increase in the need for storage capacities forces repeated system reconfigurations, thus increasing system management costs.

In order to conserve system management costs, a technology for virtualizing storages is mandatory so that a plurality of network storages can be viewed as a single storage from the computer system and the entire system is not affected by addition of new devices. Various systems are developed and proposed for such technology for virtualizing storages.

For example, "The Zebra Striped Network File System" (Hartman et. al., ACM Transactions on Computer System, vol. 13, No. 3, 1995, pp. 274-310) describes the system for distributively storing a single file in a plurality of network storages. A file is divided into a specified length and divided portions of the file are sequentially stored in a network storage on a round robin basis. There is provided a server for centrally managing in which order the file is distributively stored. The system is characterized by inquiring the resource manager of information about storage locations of the file, and then accessing data during file access processing. Namely, the system provides an effect of having a plurality of network storages virtually viewed as a single large network storage by distributively storing a file in a plurality of servers and using a single server for central file management. In addition, the U.S. patent application Ser. No. 6,029,168 describes the method for file striping according to the non-centralized resource manager system different from the above-mentioned centralized resource manager system. This system embeds starter node information in a file identifier. The starter node information stores striping information about the file. By doing so, a plurality of network storages distributively manages the striping information. Since the file identifier stores a starter node, the system first accesses the starter node during a file access and determines a location to store the file. If necessary, the system transfers an access request to a server storing fragments (blocks) of the file to be accessed and processes the file. For this reason, a client just needs to issue a request to the starter node for accessing the relevant file. There is provided an effect of eliminating the need for considering a storage location according to the file striping.

The system described in the above-mentioned Zebra Striped Network File System needs to make an inquiry into the centralized resource manager when determining a network storage for storing a file fragment to be accessed. Accordingly, when the number of network storages increases, the centralized resource manager becomes a bottleneck, causing a hindrance to the system scalability.

The non-centralized resource manager system described in the U.S. patent application Ser. No. 6,029,168 solves the problem of the centralized resource manager in the point that the resource manager is distributed into a plurality of servers. However, this system premises that, during a file access, a server such as a distributed directory is responsible for making a conversion between a file name or a directory name for uniquely specifying the file and a file identifier embedded with the starter node. The system requires additional information for managing the correspondence between a file name and a server (starter node) for managing file storage locations. The U.S. patent application Ser. No. 6,029,168 also describes that a "well-known" distributed directory file is used as a means for storing such information. When a new network storage is added and the starter node for the existing file is moved to the new network storage, it is necessary to rewrite the information about the correspondence between a file name and a file identifier stored in the distribute directory. This is because the starter node location is directly embedded in the file identifier.

SUMMARY OF THE INVENTION

It is an object of the present invention to provide a virtualized single-view method for a plurality of network storages so as to be capable of uniquely determining a network storage for storing an object to be accessed from a logical identifier for the object to be accessed. Another object of the present invention is to provide a virtualized single-view method for a plurality of network storages with improved network storage expandability.

The network storage virtualization method according to the present invention determines a network storage for storing an object based on a hash value of a logical identifier used for accessing that object, eliminating the need for maintaining the information about object storage locations in the resource manager. This decreases processing costs for inquiring of the resource manager as to the information about object storage locations and improves the system scalability. When network storages are added or deleted, there is no need to update information for the resource manager, facilitating a change of the server configuration and simplifying the operational management.

A system disclosed in the present invention is summarized as: a network storage system characterized in that the system comprises a plurality of network storage devices and processes an access request from a client connected to at least one of the plurality of network storage devices via a network, wherein the plurality of network storage devices distributively stores each object as a target for the access request in a specific network storage determined by a hash function using as an argument a logical identifier for the object.

A virtualization method for network storages using handle information disclosed in the present invention can be represented as: a network storage virtualization method characterized in that a network storage system comprises a plurality of network storage devices and provides a capability of allowing a networked client to access the network storages as virtually a single network storage, wherein, when the client requests to generate handle information used for accessing an object stored in a network storage, the system computes a hash value for a logical identifier of an object to be accessed from all logical identifiers for the object to be accessed or from some of the identifiers and known hash values included in handle information about an object higher than the object; the system returns handle information embedded with the hash value as the handle information to be accessed; and the system processes an access request from the client by using a network storage device uniquely determined by a hash value embedded in a handle for an object to be accessed.

The present invention is characterized by determining a network storage for storing objects based on a hash value for an object identifier logically identifying an object to be stored in a network storage. For example, such object identifier can be a file's full path name in a file system, a URL for a Web storage, etc. Accordingly, it is possible to eliminate management of the correspondence between an object identifier and a network storage for storing objects.

In a typical example, a client's access request is notified to any one of a group of network storages to be virtualized. When a network storage receives the access request, that network storage specifies a network storage to store an object corresponding to the access request based on an object identifier's hash value, and then transfers the access request to the specified network storage for processing. In another example, a client's access request is notified to all of the group of network storages to be virtualized. Based on an object identifier's hash value, each network storage determines whether or not the network storage itself should process the access request. When the local network storage is eligible for processing, it processes the request. An access from the client is processed in this manner.

A network storage such as FS (Network File System) developed by Sun Microsystems, Inc. or the like uses a file access protocol that does not include information for logically identifying objects such as file names, directory names, etc. in a handle for accessing files and directories. Such network storage embeds a hash value for the file's logical identifier (full path name) when generating a handle. By doing this, it is possible to determine a network storage to process an access request in the same manner as the case where the access handle includes the file's full path name.

The present invention eliminates the need to manage a table for correspondence between a logical identifier such as a file name for an object to be accessed and a network storage for physically storing that object. It is possible to provide a virtualization method for a plurality of network storages without requiring a resource manager.

Since no resource manager is needed, it becomes easy to change physical storage locations of files, dynamically add network storages, etc.

Further, no need for the resource manager eliminates a system bottleneck and improves the network storage expandability.

Since a hash function can be used to compute a file storage location from the file's logical identifier, it is possible to speed up a process of transferring an access request to an appropriate server.

DETAILED DESCRIPTION OF THE PREFERRED EMBODIMENTS

Figure 1:
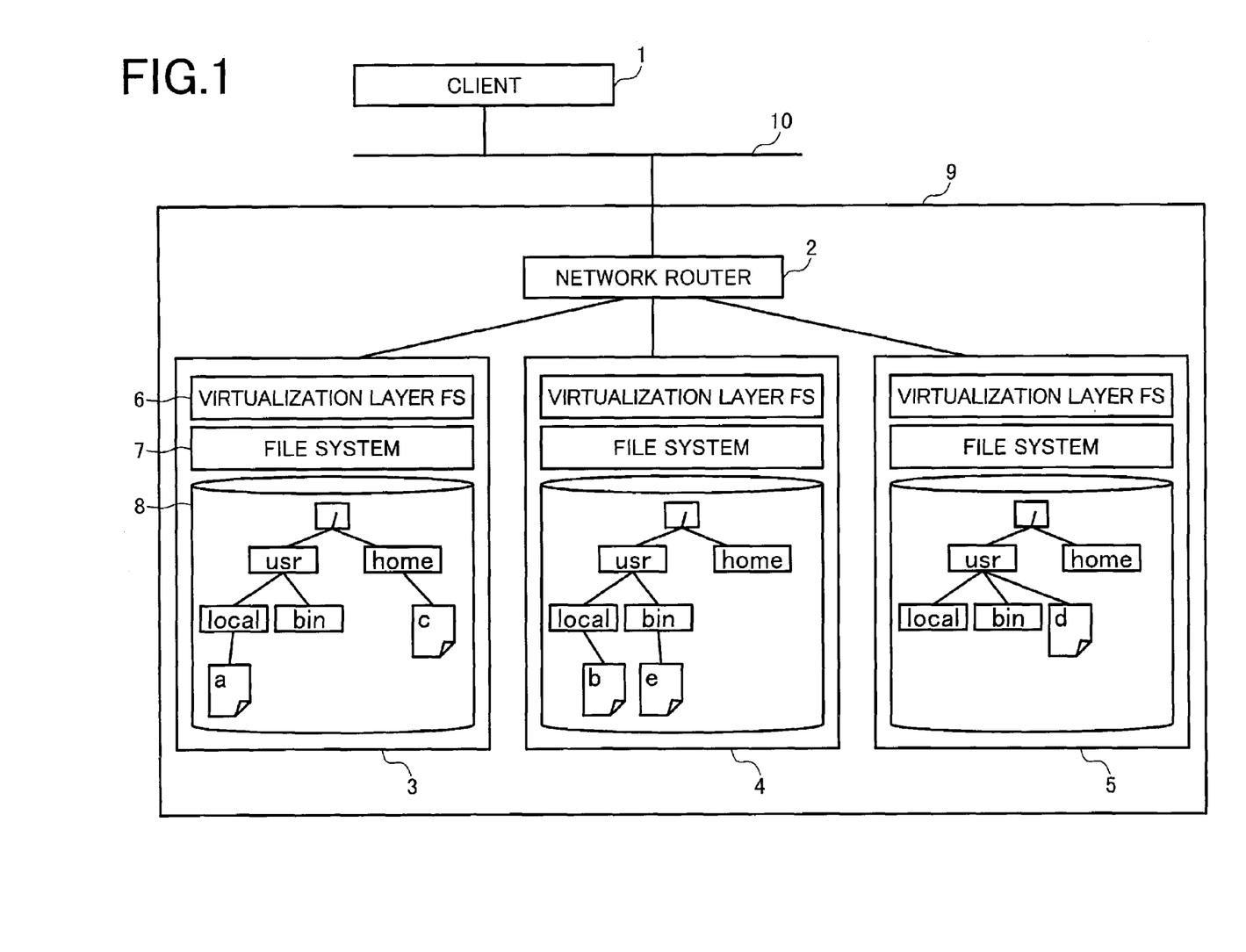
FIG. 1 shows a system configuration of a network storage virtualization method according to the present invention.

FIG. 1 shows an embodiment of the present invention. A client 1 is connected to a plurality of network storages (3, 4, 5) via a network router 2. Each network storage has a file system for processing a file access request from the client 1 and a storage system 8 accessed by the file system. Each network storage also has a virtualized single-view file system 6 for making a plurality of file systems virtually viewed as a single file system. The network router 2 and a plurality of network storages (3, 4, 5) are identified as virtually a single network storage 9 from the client. Namely, the client identifies the network storage 9 with a single network address or network identifier provided by the network router. As such network router having these capabilities, it is possible to use a router that provides a single network address to the client network and private addresses to the network storages and performs conversion between private addresses and external addresses. Obviously, it is also possible to use a network router having a capability of managing one external address and a plurality of internal addresses, and devices other than the network router such as a load distributor, a general-purpose computer such as a server or a PC, a network switch, etc. It is further possible to provide a configuration in which one network storage has a function of the network router 2. In addition, it is obvious that a plurality of network storages may be physically arranged in a single device. Furthermore, the network router may be configured according to a combination of general-purpose computers such as servers or PCs and network switches. A wired or wireless network may be available between the network router 2 and each device. It may be possible to connect a plurality of network routers 2 for distributing loads of the communication with the outside or for providing the system with redundancy.

Figure 2:
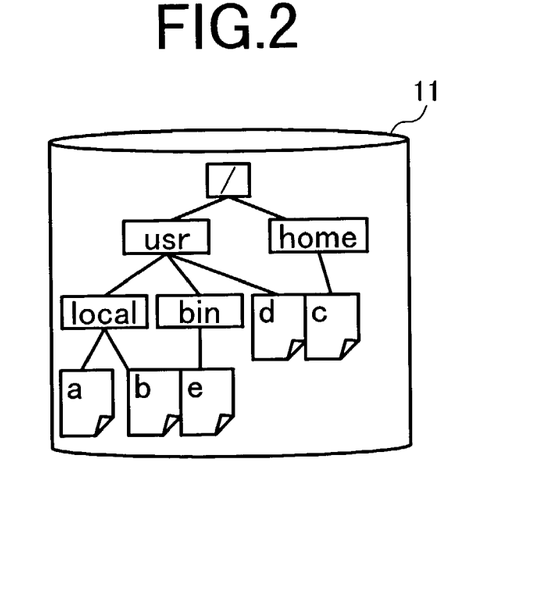
FIG. 2 shows a file system image viewed from a client.

FIG. 2 shows an image of the virtualized single-view file system viewed from the client 1. For simplicity of the description, the embodiment shows a case where a directory tree viewed from the client is the same as a directory tree of the network storage. However, the network storage's directory tree may be mounted as part of the directory tree in the client's local file system. In such case, a portion at the mount point or below becomes the network storage's directory tree. The present invention explains an example of a path name having the file's hierarchical structure as a symbol for the file system to identify files. Besides, the file identifier may be otherwise instead of the hierarchical path name. For example, it is assumed that a file system accesses a file using a keyword embedded in the file itself as an identifier. In this case, it is obvious that the virtualization of a plurality of file systems can be implemented so as to be equivalent to the present invention by processing the keyword as an identifier in the same manner as the path name.

While the embodiment describes the network file system as an example, the object itself is not limited to a file only if the network storage stores objects. The present invention relates to systems that store all objects having their logical identifiers such as Web pages. The logical identifier signifies, e.g., a file path name in the file system or a URL in the Web storage, that is, an object identifier viewed from the higher-level software independent of the storage configuration. In addition, the object identifier is not limited to uniquely specify an object, but may point to a plurality of objects. In this case, objects having the same identifier are stored in the same network storage.

The present invention provides a method of distributively storing the virtualized single-view file system as shown in FIG. 2 in a plurality of network storages (3, 4, 5) and an access method thereof. Each file is stored in a network storage uniquely determined by a file path name's hash value and a storage location determination function using as an argument the number of network storages for distributively storing files. According to the embodiment, for example, a hash function is assumed to be the remainder resulted when the sum of component character strings constituting a path name is divided by 2 to the 16th power. The storage location determination function f is assumed as follows.

$$f = \mathrm{mod}(\text{hash value}, \text{the number of network storages})$$

Namely, the hash value for a file /usr/local/a in FIG. 2 is the sum of character codes for the respective components "usr", "local", and "a" as follows.

$$(`u`+`s`+`r`)+(`l`+`o`+`c`+`a`+`l`)+(`a`)=0x03c6$$

The storage location determination function value is:

$$\mathrm{mod}(0x03c6, 3) = 0$$

The file is stored in the first network storage 3. Likewise, hash values for /usr/local/b, /usr/home/c, /usr/d, and /usr/bin/e become 0x03c7, 0x0366, 0x01be, and 0x258, respectively. Values for the storage location determination function f become 1, 0, 2, and 1. The files are stored in the corresponding network storages as shown in FIG. 1.

In this embodiment, the hash function is assumed to be the sum of character strings in each component. Obviously, the similar implementation is available by using any other functions that return a value uniquely determined in accordance with the argument value. Here, to be determined uniquely means that the same value is returned when argument values are the same, not that different values (unique values) are always returned in response to different arguments. Namely, two different arguments may return the same value. While a residue function is used as the storage location determination function, it is obvious that the similar implementation is available by using any other functions. The present invention describes the case where files are not stored redundantly. When files are stored redundantly, there is provided a plurality of types of the above-mentioned hash function or storage function. Files are stored at storage locations corresponding to the respective values. Accordingly, the present invention includes cases where there is provided a plurality of functions that return a value uniquely determined in accordance with an argument value and where one function returns a plurality of values for redundant storage.

The present invention is best characterized in that a hash value can be computed only from the file's path name or identifier and it is possible to uniquely determine the number of a network storage to store files only from the hash value and the number of network storages for distributed storage. When finding a storage location from the file's path name or identifier, a conventional distributed file system inquires of a directory server or the like for information about the storage location. The present invention completely eliminates the need for this inquiry. The conventional system needs to store a table of information indicating mapping between the file's path name or identifier and the storage location, and therefore needs to maintain this table. By contrast, the present invention requires no such table, causing no overheads for consistency sustainment, exclusive processing, maintenance for configuration changes, etc.

For simplicity, the embodiment describes the case where no file striping is performed. When the file striping is performed, it is obvious that a similar system can be easily implemented simply by adding a file's path name and an access location (or a file fragment number) as arguments of the storage location determination function.

Figure 3:
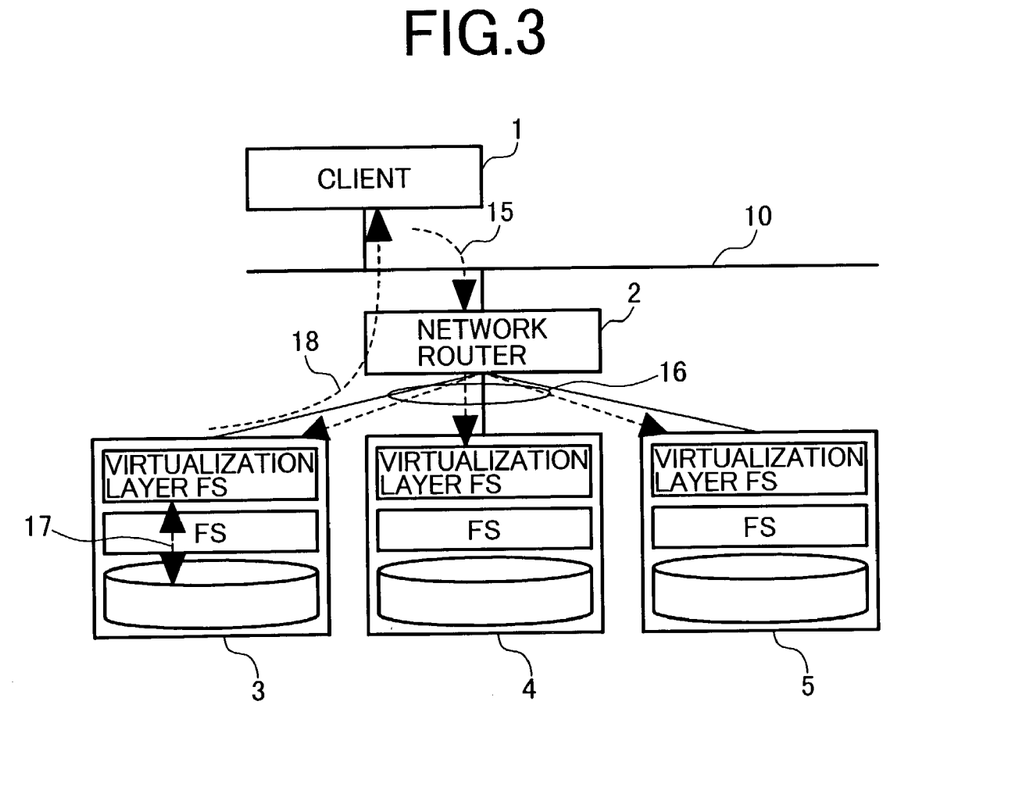
FIG. 3 outlines processing of the network storage virtualization method according to the present invention.

FIG. 3 shows a processing flow of an access request from a client. An access request issued from the client 1 is sent to the network router 2 (15). The network router forwards the received access request to a storage to be a single view through the virtualization (16). Each network storage performs processing based on the content of the received request and values of the hash function and the storage location determination function (17), and returns a result to the client 1 (18).

The Network File System (NFS) is an example of protocols for accessing a network. The NFS protocol accesses a file or a directory using handle information obtained by a LOOKUP command request without using a full path name. Since the present invention uses a full path name's hash value to determine the storage location, the handle needs to store the file's full path name or hash value. The NFS protocol permits the network storage to freely implement handles, but imposes a limitation on the file handle length. Generally, it is impossible to store the file's or directory's full path name. To solve this, part of the handle stores the full path name's hash value. This makes it possible to perform processing for determining a storage location by means of the hash value even if the handle cannot store the full path name. When a full path name is included in the identifier information used for accessing a file or a directory according to a non-NFS protocol, the identifier information may not need to include the path name's hash value. Accessing a file or a directory requires the identifier information capable of identifying an access target. When the identifier information contains the full path name, a hash value can be derived from the full path name. The hash value itself may or may not be maintained. When an access protocol includes no full path name in the identifier information, a modification is made so that the access identifier information can maintain a hash value and that the file storage location can be uniquely determined from the access identifier information. In any case, the present invention is applicable to any file access protocols. The following describes a flow of access processing by using the NFS as an example of access protocols for simplicity.

Figure 4:
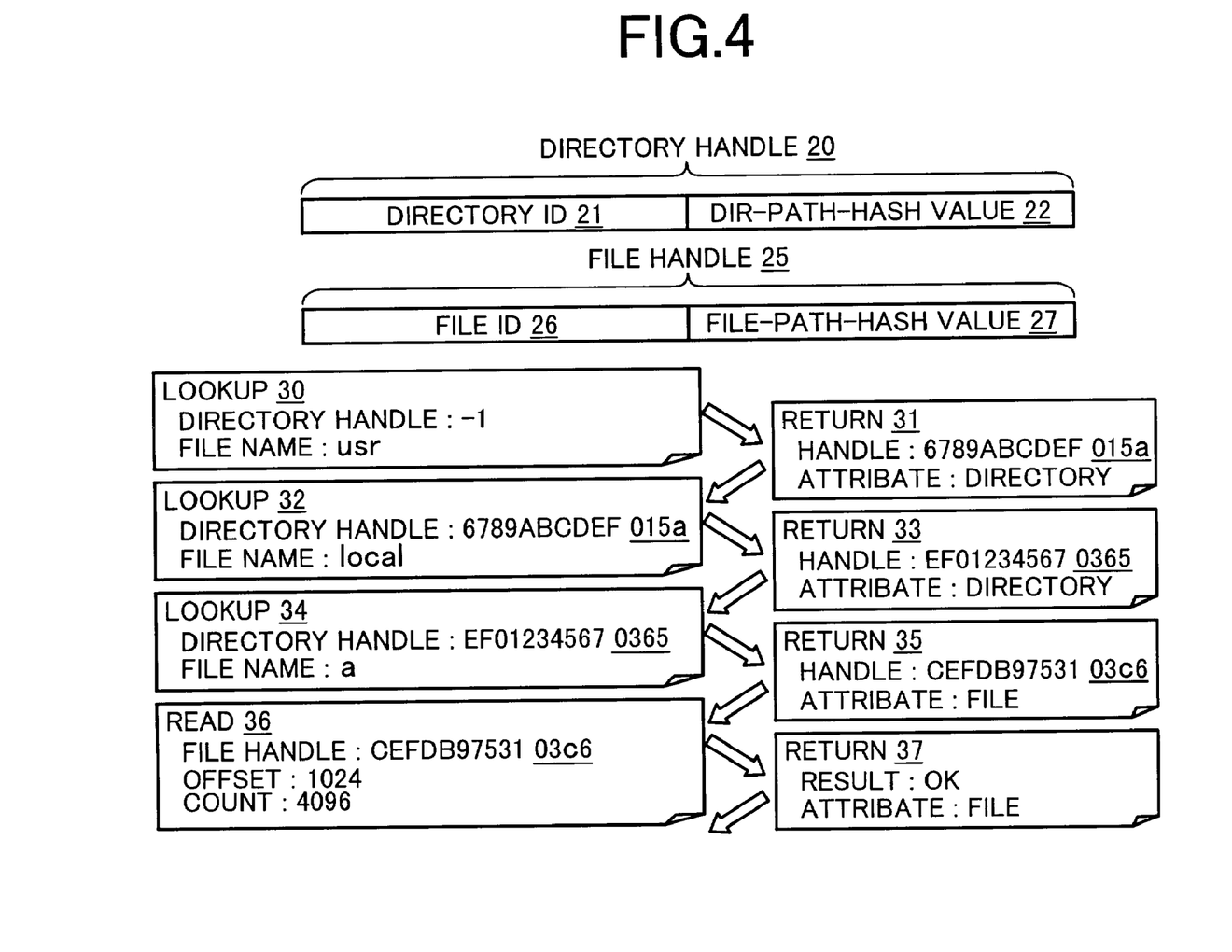
FIG. 4 shows an embodiment of a handle configuration and an example of file access processing.

FIG. 4 shows the configuration of a directory handle 20 and a file handle 25 used for access. The directory handle 20 comprises a directory identifier 21 and a directory path hash value 22. The file handle 25 comprises a file identifier 22 and a file path hash value 27. The directory identifier and the file identifier can be generated in the same manner as for conventional handles. When the handle length is fixed, however, it must be shortened for a size needed to store the path hash value. FIG. 4 explains an example of opening a file /usr/local/a and reading 4096-byte data from an offset 1024. First, a LOOKUP command 30 is issued to obtain an execution result 31. The execution result 31 contains a directory handle for /usr. The directory handle for /usr is embedded with the path hash value 0x015a (='u'+'s'+'r'). Then, the directory handle is used to look up a directory of /usr/local (32) to obtain an execution result 33. The execution result 33 contains a directory handle for /usr/local. The directory handle for /usr/local is embedded with the path hash value 0x0365 (='u'+'s'+'r'+'l'+'o'+'c'+'a'+'l'). Then, the LOOKUP operation is performed for /usr/local/a (34) to obtain its file handle (35). Finally, a READ command is issued to read data by using the obtained file handle (36).

The NFS protocol or the like uses, e.g., a pointer to inode to make one-to-one correspondence between a handle and a file or a directory. The present invention stores files in a plurality of network storages. Consequently, in the case of a protocol like NFS in which the handle does not contain a file's full path name, a local mapping table or the like may be needed for one-to-one correspondence between the actual directory and the handle. With respect to these considerations, an appropriate technique can be implemented according to specifications of an applicable network protocol.

Figure 5:
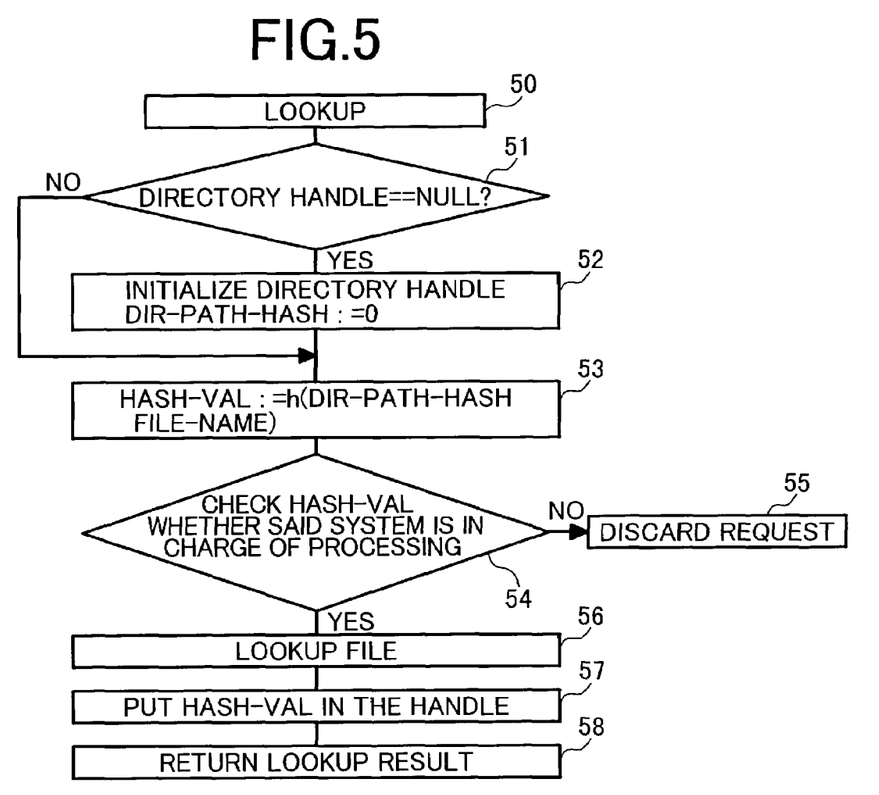
FIG. 5 is a flowchart showing a flow of LOOKUP processing.

FIG. 5 shows a processing flow of a LOOKUP command to obtain the file or directory information. When the virtualized single-view file system receives the LOOKUP command (50), the system checks whether or not the directory handle is specified (51). When the directory handle is specified, the process proceeds to step 53. Otherwise, the directory handle is initialized to reset the directory path hash value to 0 (52). The system calls the hash function to find a hash value by using, as arguments, the directory path hash value and the file name (or the directory name) to be accessed that are stored in the directory handle (53). The system uses the storage location determination function to determine whether or not the hash value is to be processed by the local system (54). When the hash value is not to be processed by the local system, the request is discarded (55). When the hash value is to be processed by the local system, the corresponding file is looked up (56). The system embeds the resulting hash value found at step 53 in the handle information (57), and then returns a result to the requesting client. When the LOOKUP operation fails, the system performs appropriate processing such as returning error information to the client. The error processing is implemented in accordance with applicable file access protocol specifications. The above-mentioned example has presented the processing flow by embedding the hash value instead of the path name in the handle on the assumption that the handle does not contain the file's path name. When the handle contains the file's path name, the system computes the hash value using the directory's path name and file name at step 53 for finding the hash value. In this case, there is no need for step 57 that embeds the hash value in the file handle obtained as a result of LOOKUP.

Commands such as CREATE, SYMLINK, MKNOD, REMOVE, etc. follow the processing flow similar to that for LOOKUP. Since no file handle is contained in a return value during a REMOVE operation, this operation does not require a process equivalent to step 5 for embedding a hash value in the handle.

Figure 6:
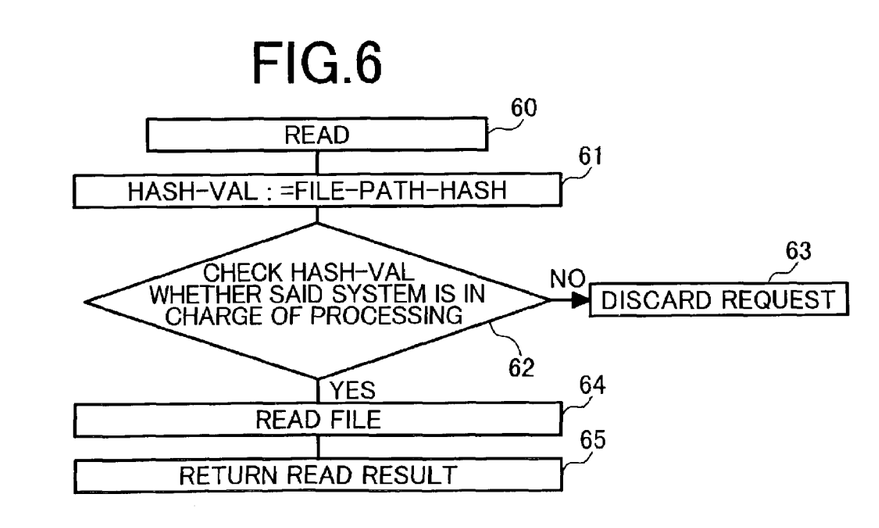
FIG. 6 is a flowchart showing a flow of READ processing.

FIG. 6 shows a processing flow of a READ command to read a file. When receiving the READ command (60), the system retrieves a file path hash value stored in the file handle (61). The system uses the storage location determination function to check whether or not the hash value is to be checked by the local server (62). When the hash value is not to be checked by the local server, the system discards the request (63). When the hash value is to be checked by the local server, the system reads the corresponding file (64), and then returns a result to the requesting client (65). Also in this processing, the processing against an error occurrence is appropriately installed in accordance with applicable access protocol specifications.

Commands such as WRITE, GETATTR, SETATTR, READLINK, STATFS, etc. follow the processing flow similar to that for READ.

Figure 7:
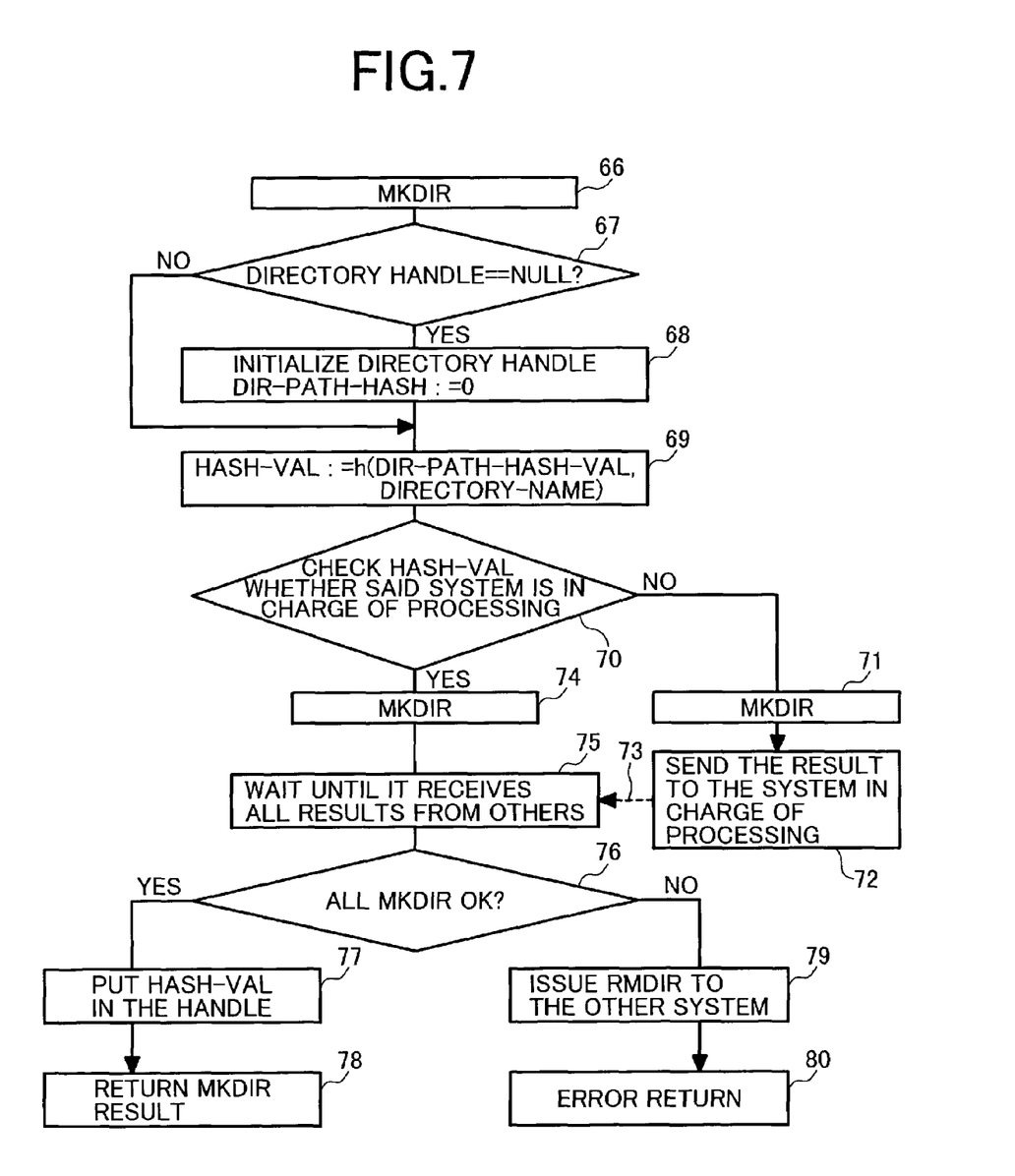
FIG. 7 is a flowchart showing a flow of MKDIR processing.

FIG. 7 shows a processing flow of an MKDIR command to create a directory. When receiving the MKDIR command (66), the system checks whether or not the directory handle is specified (67). When the directory handle is specified, the process proceeds to step 69. Otherwise, the directory handle is initialized to reset the directory path hash value to 0 (67). The system calls the hash function to find a hash value by using, as arguments, the directory path hash value and the directory name that are stored in the directory handle (69). The system uses the storage location determination function to determine whether or not the obtained hash value is to be processed by the local system (70). When the hash value is not to be processed by the local system, the virtualized single-view file system executes the MKDIR command to create the specified directory (71). The system sends the result to a network storage device that should process the MKDIR command (72). When the hash value is to be processed by the local system, the virtualized single-view file system executes the MKDIR command to create the specified directory (74). The system then waits until receiving a notification of MKDIR execution results from all the other network storage devices (75). Upon reception of the results from all the network storage devices, the system checks whether or not all the results are successful (76). If they are successful, the system embeds the hash value in the directory handle to be returned (77), and then returns the result to the requesting client (78). Otherwise, the system issues an RMDIR command for removing the created directories to all the servers that succeeded in MKDIR, and then returns an error to the requesting client. When RMDIR fails or an error occurs at the other processes (e.g., sending or receiving a notification at step 73), the system performs the error processing in accordance with applicable protocol specifications.

The RMDIR also follows the processing flow similar to that for the MKDIR command. That is, the RMDIR command removes directories specified by all the servers. When some servers failed in the RMDIR command, the system implements error processing in accordance with protocols, for example, by executing the MKDIR command for the servers that succeeded in the RMDIR command to recover the present state and returning the error.

Figure 8:
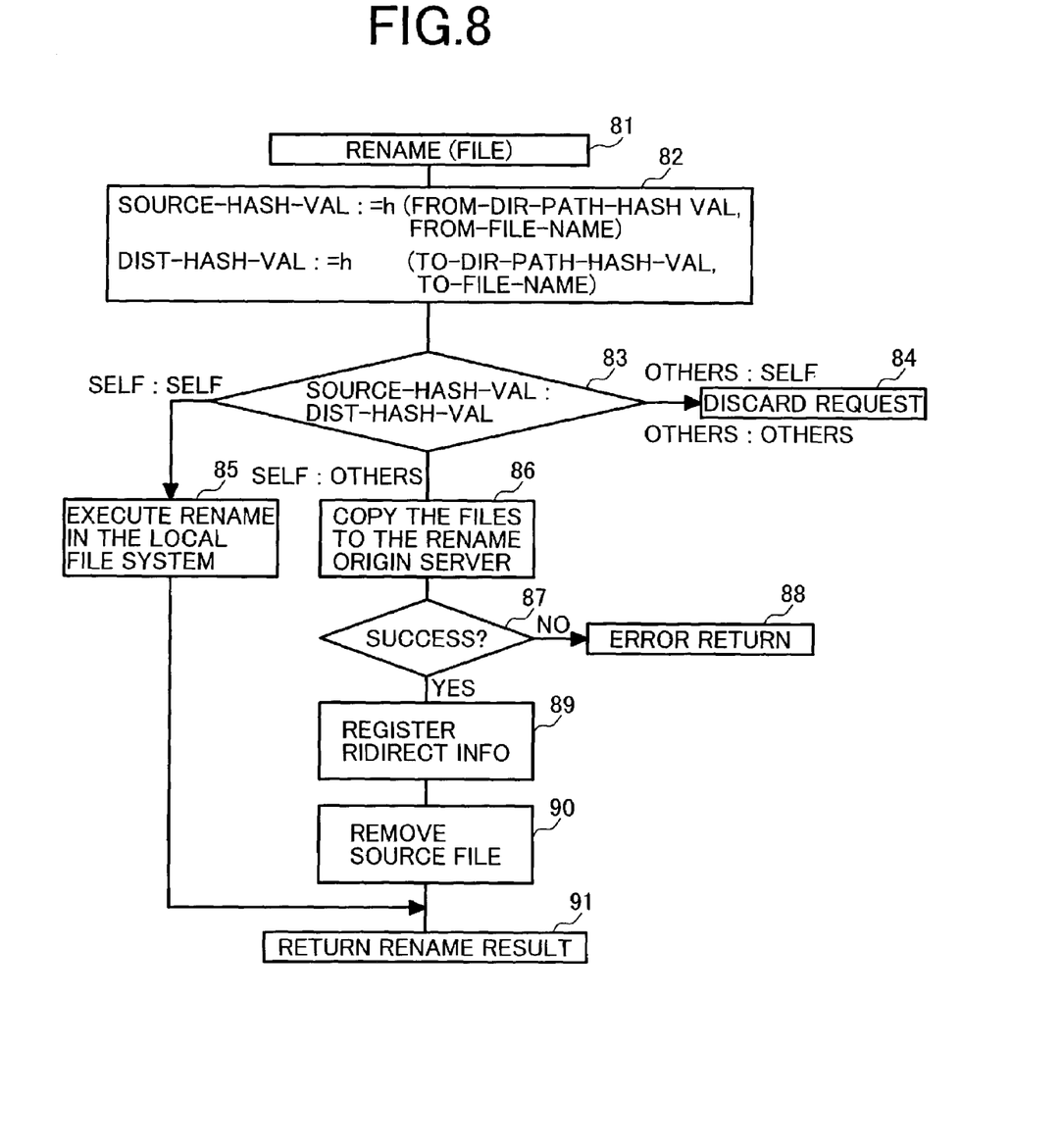
FIG. 8 is a flowchart showing a flow of RENAME processing.

FIG. 8 shows a processing flow of a RENAME command to change a file name. When receiving the RENAME command (81), the system finds hash values for the rename origin file and the rename destination file (82). Based on the storage location determination function, the system determines whether or not the local network storage device should process the hash values for the rename origin and the rename destination (83). When the local network storage device should process the hash values for the rename origin and the rename destination, the local network storage device processes the RENAME command (85). When the rename origin is the local network storage device and the rename destination is the other network storage device, the system copies the file to the rename destination server (86), then determines whether or not the copy succeeded (87). When the copy failed, the system returns an error to the requesting client (88). When the copy succeeds, the system registers file handle redirect information (89) and removes the rename origin file (90). The file handle redirect information is a table that stores a pair of the rename origin's file handle and the rename destination's file handle. A server to store files before rename maintains this table for a specified period of time in order to validate the handle before rename for the specified period. The redirect information is referenced for mapping between the handle and the actual file. This intends to enable an access to a file whose storage location is changed due to rename. The file handle registered in the table is automatically changed to a file handle after rename and is transferred as an access to the relevant server. When the rename origin is determined to be the local server at step 83, the system performs the above-mentioned processing, and then returns a result to the requesting client (91). Otherwise, the system discards the request (84).

FIG. 8 shows the processing flow when the RENAME command should be executed for files. When the RENAME command should be executed for directories, various implementation methods are available. For example, the MKDIR command is recursively executed for the rename origin directory up to the lowest layer. Then, the RENAME command is sequentially executed for files contained in the relevant rename origin directory. Finally, the RMDIR command is executed for the rename origin directory up to the lowest layer. In addition to this method, it is obviously possible to provide various directory RENAME commands to which the present invention can be applied.

Figure 9:
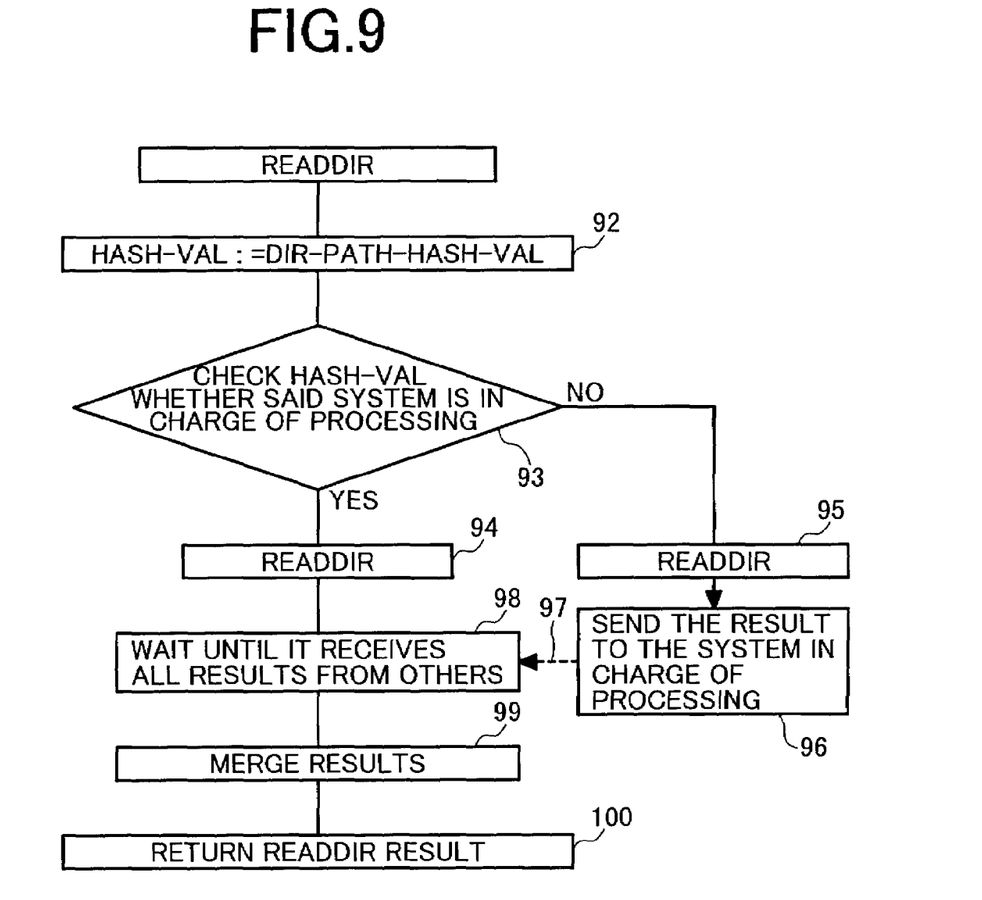
FIG. 9 is a flowchart showing a flow of READDIR processing.

FIG. 9 shows a processing flow of a READDIR command to obtain directory information. Upon reception of the READDIR command, the system retrieves a hash value for the directory handle (92). Using the storage location determination function, the system checks whether or not the local server should process the hash value (93). If this is not true, the system executes the READDIR command (95) and sends a result to a network storage device for which the READDIR command should be executed (96). When the local system is the network storage device for which the READDIR command should be executed, the system executes the READDIR command (94) and waits until receiving execution results (97) of the READDIR command from all the other network storage devices (98). When receiving all results of the READDIR command, the system merges these results (99) and returns a result to the requesting client (100).

According to the embodiment, all network storages have the same directory tree structure. The MKDIR command and the RMDIR command are executed on all servers. One server specified by the storage location determination function settles these execution results and responds to the client. However, another embodiment is available wherein only one server specified by the storage location determination function executes the MKDIR or RMDIR command. In this case, when the parent directory specified during the directory or file creation is unavailable in an execution server specified by the storage location determination function, directories up to that parent directory need to be generated in a manner similar to that for executing the generation command. Since there is a server that contains no directory, the READDIR command needs to correct the processing flow corresponding thereto. In any case, it is obvious that these operations can be easily implemented.

Figure 10:
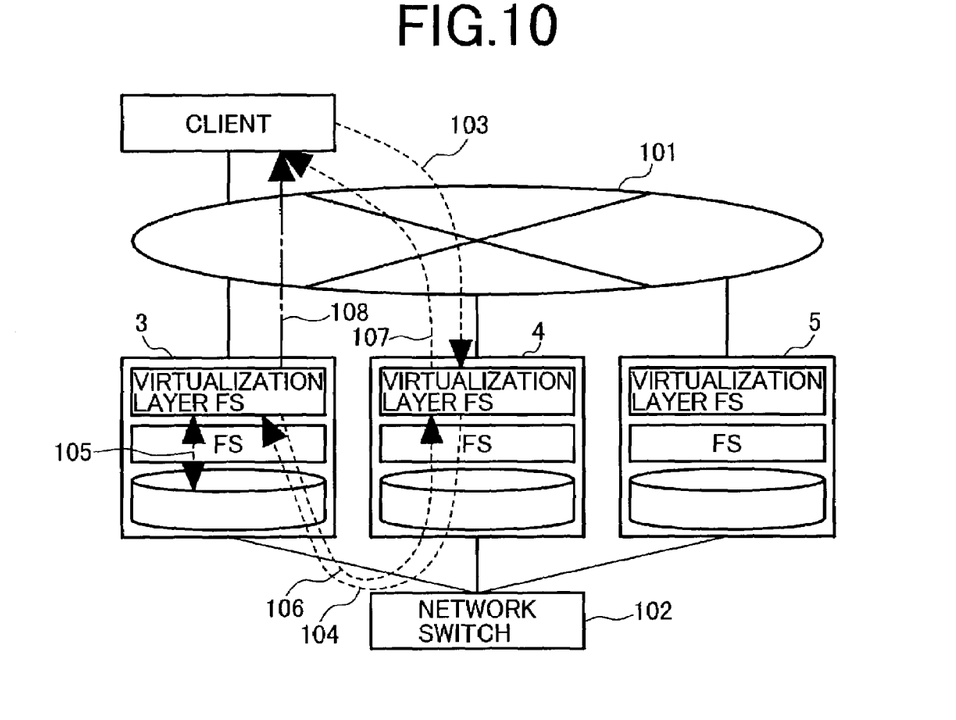
FIG. 10 shows another system configuration example and a processing flow of the network storage virtualization method according to the present invention.

FIG. 10 shows another embodiment of the present invention. In this embodiment, the network storages (3, 4, 5) are connected to each other via the client and a network 101. The client can view IP addresses of all the network storages. A connection is made between the network storages via a network switch 102 for sending and receiving commands and data without applying a load to the network 101. In this case, the client issues an access request to any one of the network storages (103). A network storage 4 receives the access request and, based on the path name's hash value, determines a network storage to be executed. When the network storage to be executed belongs to the other network storages, the access request is transferred to the network storage to be executed (104). The network storage receives the transferred access request, processes it (105), and returns the result to the client 1 via the network storage 4 that accepted the access request (105, 106). When the access request is permitted to be returned from a different server, it may be preferable to directly send the result to the requesting client from the network storage that executed the access request (108). Rewriting an origin IP address on the Internet easily makes it possible to implement an equivalent of the operation for returning a result via the server that accepted the access request. When a load to the network 101 is of no significance, it is of course possible to omit the network switch 102 and provide communication between servers via the network 101.

Figure 11:
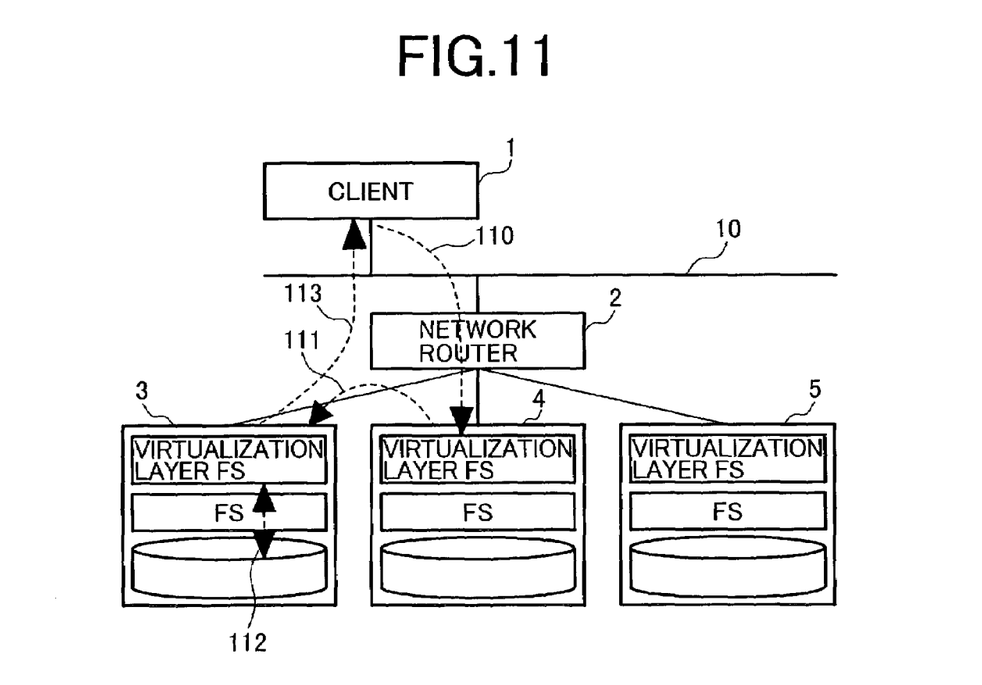
FIG. 11 shows yet another system configuration example and a processing flow of the network storage virtualization method according to the present invention.

FIG. 11 shows yet another embodiment of the present invention. This embodiment uses the same hardware configuration as that for the embodiment shown in FIG. 3. When the client issues an access request 110, the network router 2 transfers the access request to one of a group of network storages (the network storage 4 in FIG. 11). The network router 2 uses, e.g., a round robin technique as a method of determining to which network storage the access request should be transferred. When receiving the transferred access request, the network storage determines a network storage which should process the request in the manner similar to that for each network storage according to the embodiment in FIG. 1, that is, based on a hash value of the logical identifier (file's path name) for an access target. When the network storage that received the request should process the request, that network storage processes the request. When another network storage should process the request (as shown in FIG. 11), the network storage transfers the request to another network storage that should process the request (111). The network storage receiving the request processes the transferred request (112) and returns a result to the client (111). The request may be returned via the network storage that first received the request.

Figure 12:
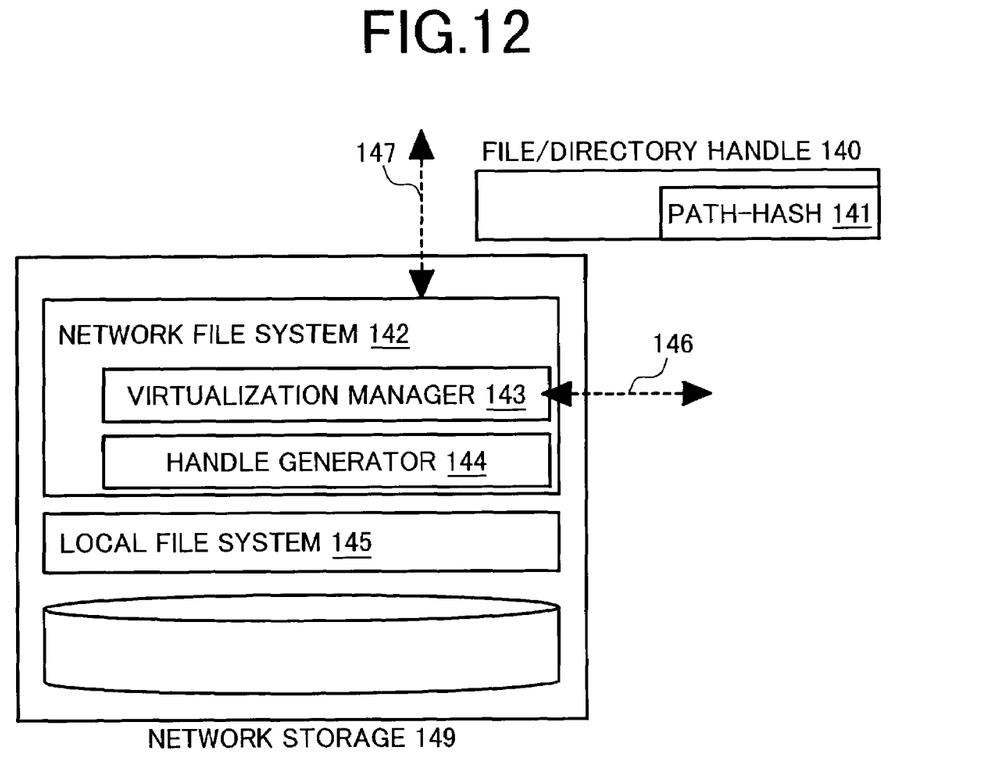
FIG. 12 shows an embodiment of the network storage software configuration.

FIG. 12 shows an embodiment of the network storage software configuration of a network storage 149. In FIG. 12, a virtualization manager 143 is installed in a network file system 142. A handle generator 144 generates a global handle 140 for the overall system. When the handle contains no full path for files or directories, a path's hash value 141 is embedded in the handle 140. The virtualization manager 143 interchanges an access request 147 received from the client with the other network storages as needed (146).

Figure 13:
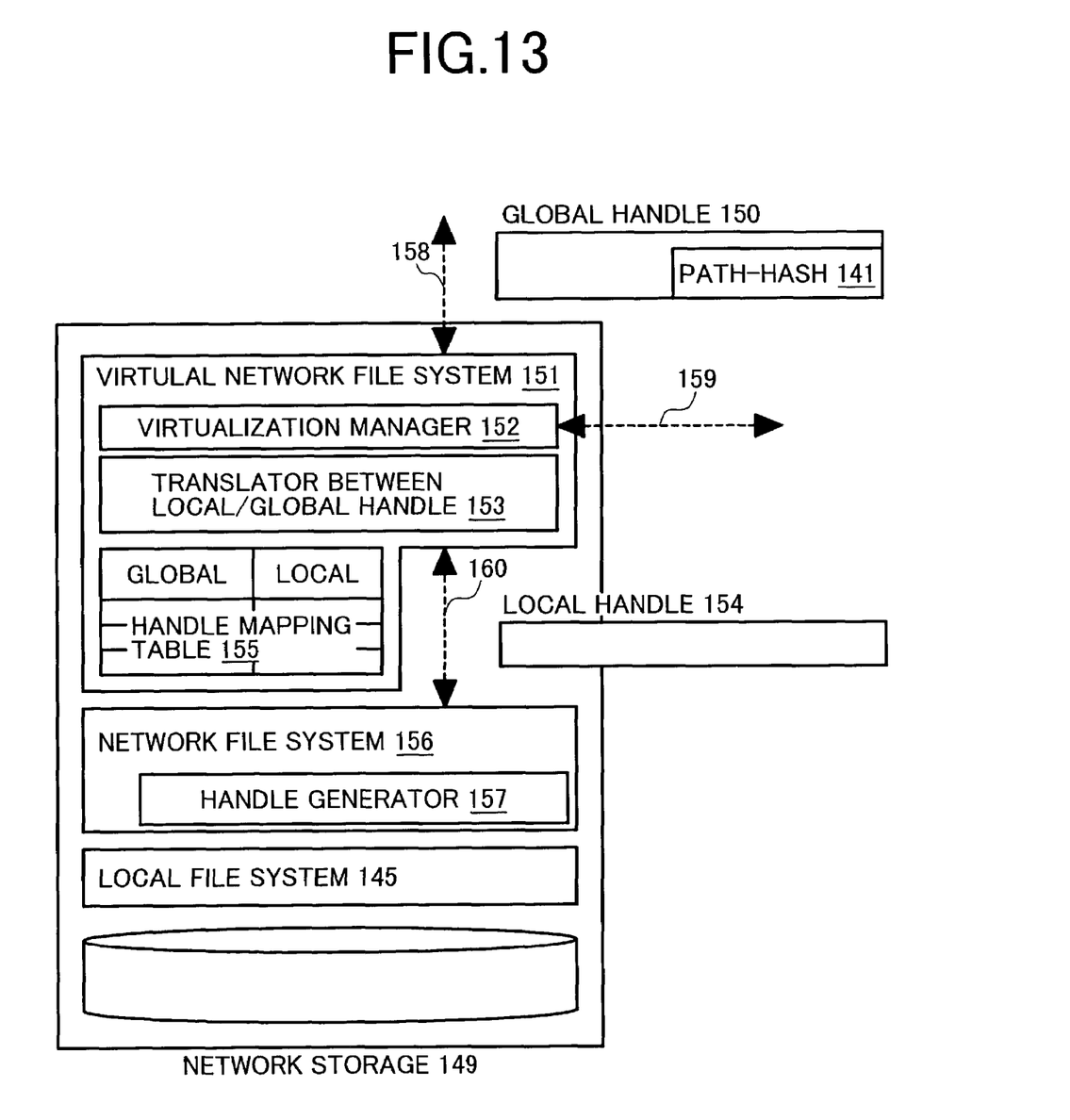
FIG. 13 shows another embodiment of the network storage software configuration.

FIG. 13 shows another embodiment of the network storage software configuration of the network storage 149. In FIG. 13, a virtualization network file system 151 is positioned higher than a network file system 156. The virtualization network file system 151 has a virtualization manager 152 and a translator between local/global handle 153. According to this software configuration, the translator between local/global handle 153 provides mapping between a local handle 154 locally generated by the network file system 156 and a global handle 150 commonly used with the other network storages. The translator between local/global handle 153 references a handle mapping table 155 to translate the global handle specified by the client into the local handle used by the network file system 156. The virtualization manager 152 interchanges an access request with the other network file systems as needed (159).

What is claimed is:

1. A network storage virtualization method in a network storage system for a client connected thereto via a network, said network storage system being composed of an access routing means and a plurality of network storages each including a physical network storage device and a storage virtualization unit, said storage virtualization unit providing the client with a view of a virtual network storage system instead of a view of physical structure of the plurality of network storage devices, the virtualization method comprising steps of:

storing files dispersedly in the plurality of physical network storage devices corresponding to hash values determined by hashing a logical identifier of an access location where one of the files is physically stored for each of the files; and when a request to generate a file handle to access one of the stored files is received from the client, embedding one of said hash values corresponding to an access location where the file is physically stored in the handle by:

receiving from the client a first LOOKUP command including a first handle, according to an NFS protocol command;

determining whether a first level directory is specified in the first handle;

when the first level directory is specified therein, computing a first path from a root directory to the first level directory with a first hash value related to the first level directory, the first hash value being included in the first handle;

executing the first LOOKUP command based upon the first path for the first level directory;

obtaining a second path for a second level directory which is lower than the first level directory from the root directory;

generating a second hash value related to a second path from the root directory to the second level directory;

returning to the client a second handle including the second hash value related to the second path, as a result of executing the first LOOKUP command;

receiving from the client a second LOOKUP command including the second handle;

computing the second path for the second level directory with the second hash value related to the second level directory;

executing the second LOOKUP command based upon the second path;

when an object specified in the second handle is a file stored under the second level directory or a third level directory lower than the second level directory from the root directory, generating a third hash value related to a third path from the root directory to the object, returning to the client a third handle including a third hash value related to the object, as a result of executing the second LOOKUP command, the third handle being either the file handle or a directory handle; and (1) when the object is the file, receiving from the client a READ command including the third hash value related to a file path from the root directory to the file, (2) when the object is the third level directory, receiving from the client a third LOOKUP command including the third hash value related to a directory path from the root directory to the third level directory.

2. The network storage virtualization method according to claim 1, wherein the hash value of said logical identifier of the file is computed from a hash value which is embedded in the handle from a path name specifying the file to be accessed.

3. The network storage virtualization method according to claim 1, wherein, in case that the access request from the client is received by one of the network storages which does not store the requested file therein, the network storage forwards the access request to a physical storage network device in another one of the network storage corresponding to the hash value.

4. The network storage virtualization method according to claim 1, wherein the logical identifier of an access location of a file is a full path name of the file.

5. A network storage connected to a client via network, comprising:

a plurality of physical network storage devices; and a storage virtualization unit for providing the client with a view of a virtual network storage system instead of a view of a physical structure of the plurality of network storage devices, wherein said storage virtualization unit hashes a logical identifier of an access location where one of the files is physically stored for each of a plurality of files to obtain hash values and to dispersedly store the files in the plurality of physical network storage devices corresponding to the hash values, and when receiving from the client a request to generate a file handle to access one of the files, said storage virtualization unit embeds one of said hash values corresponding to an access location of the file in the handle by:

receiving from the client a first LOOKUP command including a first handle, according to an NFS protocol command;

determining whether a first level directory is specified in the first handle;

when the first level directory is specified therein, computing a first path from a root directory to the first level directory with a first hash value related to the first level directory, the first hash value being included in the first handle;

executing the first LOOKUP command based upon the first path for the first level directory;

obtaining a second path for a second level directory which is lower than the first level directory from the root directory;

generating a second hash value related to a second path from the root directory to the second level directory;

returning to the client a second handle including the second hash value related to the second path, as a result of executing the first LOOKUP command;

receiving from the client a second LOOKUP command including the second handle;

computing the second path for the second level directory with the second hash value related to the second level directory;

executing the second LOOKUP command based upon the second path;

when an object specified in the second handle is a file stored under the second level directory or a third level directory lower than the second level directory from the root directory, generating a third hash value related to a third path from the root directory to the object, returning to the client a third handle including a third hash value related to the object, as a result of executing the second LOOKUP commend, the third handle being either the file handle or a directory handle; and (1) when the object is the file, receiving from the client a READ command including the third hash value related to a file path from the root directory to the file, (2) when the object is the third level directory, receiving from the client a third LOOKUP command including the third hash value related to a directory path from the root directory to the third level directory.

6. The network storage according to claim 5, wherein, in case that the access request from the client is received by one of the network storages which does not store the requested file therein, said storage virtualization unit determines a location in the network address from the hash value, and forwards the request to the location in the network.

7. The network storage according to claim 5, wherein the logical identifier of a file is a full path name of the file.

* * * * *